(12) United States Patent
Fong et al.

(10) Patent No.: US 7,864,818 B2
(45) Date of Patent: Jan. 4, 2011

(54) MULTINODE SYMMETRIC LOAD SHARING

(75) Inventors: Rodney Fong, Pleasanton, CA (US);
Ravikanth Samprathi, San Jose, CA (US); Milton Xu, San Jose, CA (US); Suran de Silva, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 12/062,863

(22) Filed: Apr. 4, 2008

(65) Prior Publication Data

US 2009/0252036 A1  Oct. 8, 2009

(51) Int. Cl.
*H04J 3/04* (2006.01)
(52) U.S. Cl. ...................................................... 370/536
(58) Field of Classification Search ................. 370/536, 370/235, 232
See application file for complete search history.

(56) References Cited

U.S. PATENT DOCUMENTS 5,959,968 A  9/1999 Chin

2007/0206501 A1*  9/2007 Alesi et al. ................... 370/235
2008/0074996 A1*  3/2008 Fourcand ..................... 370/225
2008/0298236 A1*  12/2008 Ervin et al. .................. 370/232

OTHER PUBLICATIONS

White Paper: Link Aggregation according to IEEE 802.3ad available on the web at http://legacyweb.triumf.ca/canarie/amsterdam-test/References/wp-lag-e.pdf.
Understanding EtherChannel Load Balancing andRedundancy on Catalyst Switches available on the web at http://72.163.4.161/en/US/tech/tk389/tk213/technologies_tech_note09186a0080094714.shtml.
Configuring EtherChannels available on the web at http://www.cisco.com/en/US/docs/switches/lan/catalyst2950/software/release/12.1_9_ea1/configuration/guide/swethchl.pdf.

* cited by examiner

*Primary Examiner*—Derrick W Ferris
*Assistant Examiner*—Mohammad Anwar
(74) *Attorney, Agent, or Firm*—Charles E. Krueger

(57) ABSTRACT

In one embodiment, a load-balancing algorithm ensures that both network nodes at endpoints of a group of physical links aggregated into a logical channel are using the same load-sharing algorithm and also ensures that the load-sharing algorithm is normalized so that the same flow traverses the same physical link in both directions.

18 Claims, 5 Drawing Sheets

MULTINODE SYMMETRIC LOAD SHARING

TECHNICAL FIELD

The present disclosure relates generally to load-sharing systems utilizing a number of links between two nodes in a network which are aggregated into a single logical channel, and also relates generally to load-sharing systems utilizing a number of next-hop adjacencies for multipath routing.

BACKGROUND OF THE INVENTION

Link aggregation is a networking technique of treating multiple physical links between two network nodes as a single logical channel. This allows load sharing of traffic among the links in the channel as well as redundancy in the event that one or more of the links in the channel fails.

One example of a link aggregation system is EtherChannel which aggregates the bandwidth of up to n (where n is a positive integer) compatibly configured ports into a single logical channel.

To distribute the load across the included ports in an EtherChannel, a hash algorithm computes a hash value in the range 0 to n−1 based on fields selected from a packet to be transmitted. Examples of these fields are a frame's MAC addresses (Layer 2 [L2]), IP addresses (Layer 3 [L3]), or port numbers (Layer 4 [L4]). With the selected fields as a basis, a particular port in the EtherChannel is chosen by the hash. Each hash value selects a port and each port can accept multiple hash values. If there are four ports in the EtherChannel, each port accepts two hash values, and so forth. A similar algorithm is used for load sharing at layer 3 across multipath next-hop adjacencies.

DESCRIPTION OF EXAMPLE EMBODIMENTS

Overview

A technique for symmetric multinode load sharing which determines that two adjacent network nodes, connected by a plurality of links aggregated into a load-sharing channel, are utilizing the same load-sharing algorithm to direct all packets of a given bidirectional flow to the same link in the plurality of links by ensuring that the first and second network nodes insert field values as values to the load-sharing algorithm in a normalized order, and by ensuring the two adjacent network nodes identically enumerate interfaces connected to the plurality of links so that bidirectional packets of the same flow are directed to the same link by both the adjacent network nodes.

DESCRIPTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase "an example embodiment" at various places in the specification does not necessarily refer to the same example embodiment.

As described above, each network node, such as a router, switch, bridge, etc., uses a load distribution algorithm to distribute the transmission of packets over the links aggregated in the logical channel. For example, in EtherChannel the load distribution algorithm is a hash algorithm which has inputs taken from designated fields in a packet to be transmitted and which outputs a value between 0 and n−1. The hashing algorithm is deterministic so that the selected fields from all bidirectional packets in the same flow will be hashed to the same value and transmitted on the same physical link.

Figure 1:
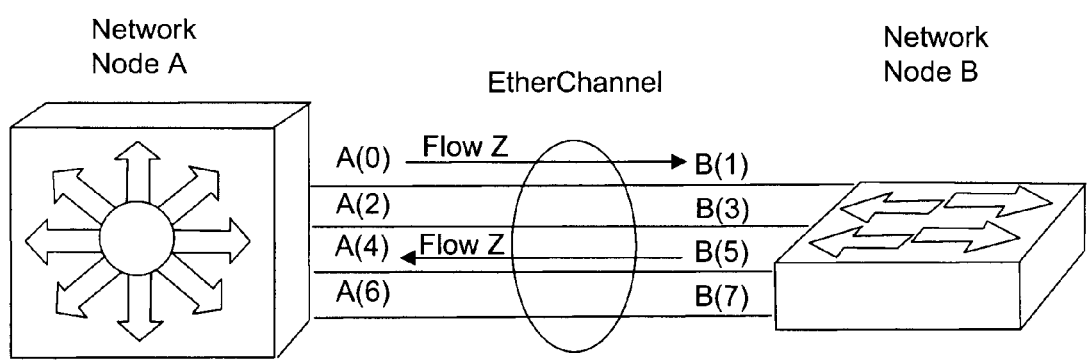
FIG. 1 illustrates example network nodes coupled by links aggregated into a load-sharing logical channel.

FIG. 1 depicts network nodes A and B coupled by four links which have been aggregated into an EtherChannel. As depicted in FIG. 1, in existing link aggregation systems the traffic in a flow may traverse a different link in one direction than in the other direction. In this example, Flow(Z) is transmitted from port A(0) on Node A and traverses link A(0)-B(1) and Flow(Z) is transmitted from port B(5) on Node B and traverses link B(5)-A(4).

In the following, example embodiments will be described which provide symmetric load sharing across links, aggregated into a logical channel, between adjacent network nodes A and B by ensuring that network node B directs a given flow onto the same link as used for that flow by network node A.

A first example embodiment will now be described, by way of example not limitation, that is implemented in an EtherChannel environment. In this example a protocol is described that normalizes the hash algorithm on network nodes A and B to assure symmetric bidirectional load sharing. Additionally, a technique that allows negotiation between network nodes A and B to implement the protocol will be described.

The normalization protocol will now be described. There are three aspects to normalization. A first aspect is to determine whether both nodes A and B are using the same load-distribution algorithm.

In the case where the network nodes A and B use the same deterministic hash function it must be assured that the same values are inserted into the hash function at both nodes A and B. As described above, the hash function has inputs based on fields included in a packet to be transferred.

A second aspect of normalization ensures that the order of the values of the hash function are the same at the network nodes for both directions of any given flow. This aspect of the normalization process can be understood by considering the values to be the source and destination IP addresses. The hash function is then of the form h[IP1, IP2]. Network nodes A and B must be configured to order the IP address values of the hash function in the same order.

This is not always the case. For example, if the network nodes ordered the values as source and destination addresses, e.g., h[IP(s), IP(d)], then the values would be reversed for the same flow at network nodes A and B because the source address at network node A would be the destination address at network node B. In this example embodiment, each network node utilizes an algorithm to order hash function values in the same order. For example, in the case of two values an example algorithm is to put the larger IP address as the first value and the smaller IP address as the second value. This would assure that the same flow hashes to the same value at both network nodes A and B regardless of direction of the flow.

The third aspect of normalization is to ensure that network nodes A and B identically enumerate the interfaces of the load-shared links so that the same output of the load-sharing algorithm selects the same physical link for packet transmission. For example, referring to FIG. 1, if the hash function output for IP(s) and IP(d) of a given flow is 7 then it must be assured that 7 selects the same link, e.g., link A(2)-B(3) at both network nodes A and B.

An example embodiment of a negotiation technique that sets up symmetric load sharing between network nodes A and B will now be described. The presently described example embodiment is an extension of the Packet Aggregation Protocol (PAgP) utilized in EtherChannel. PAgP aids in the automatic creation of EtherChannel links. PAgP packets are sent between EtherChannel-capable ports in order to negotiate the formation of an aggregated channel. PAgP packets are sent using the same multicast group MAC address that is used for Cisco Discovery Protocol (CDP) packets. This ensures that PAgP packets will not transparently traverse a node that understands PAgP. The source MAC address should be the MAC address of the physical port from which the PAgP packet is sent.

Each PAgP packet includes at least one type, length, and value (TLV) field. The following is a list of TLV definitions introduced and utilized in this example embodiment:

SANN: Symm Protocol Master Announce TLV (type 10)

SCC: Symm Protocol Master Change TLV (type 11)

SACK: Symm Protocol Master Ack TLV (type 12)

SPP: Symm Protocol Port Number TLV (type 13)

SALG: Symm Protocol Algorithm Specification TLV (type 14)

STUPLE: Symm Protocol Tuple Definition TLV (type 15)

SCLOSE: Symm Protocol Close Connection TLV (type 16)

SCLOSEACK: Symm Protocol Close Connection Ack TLV (type 17)

Figure 2:
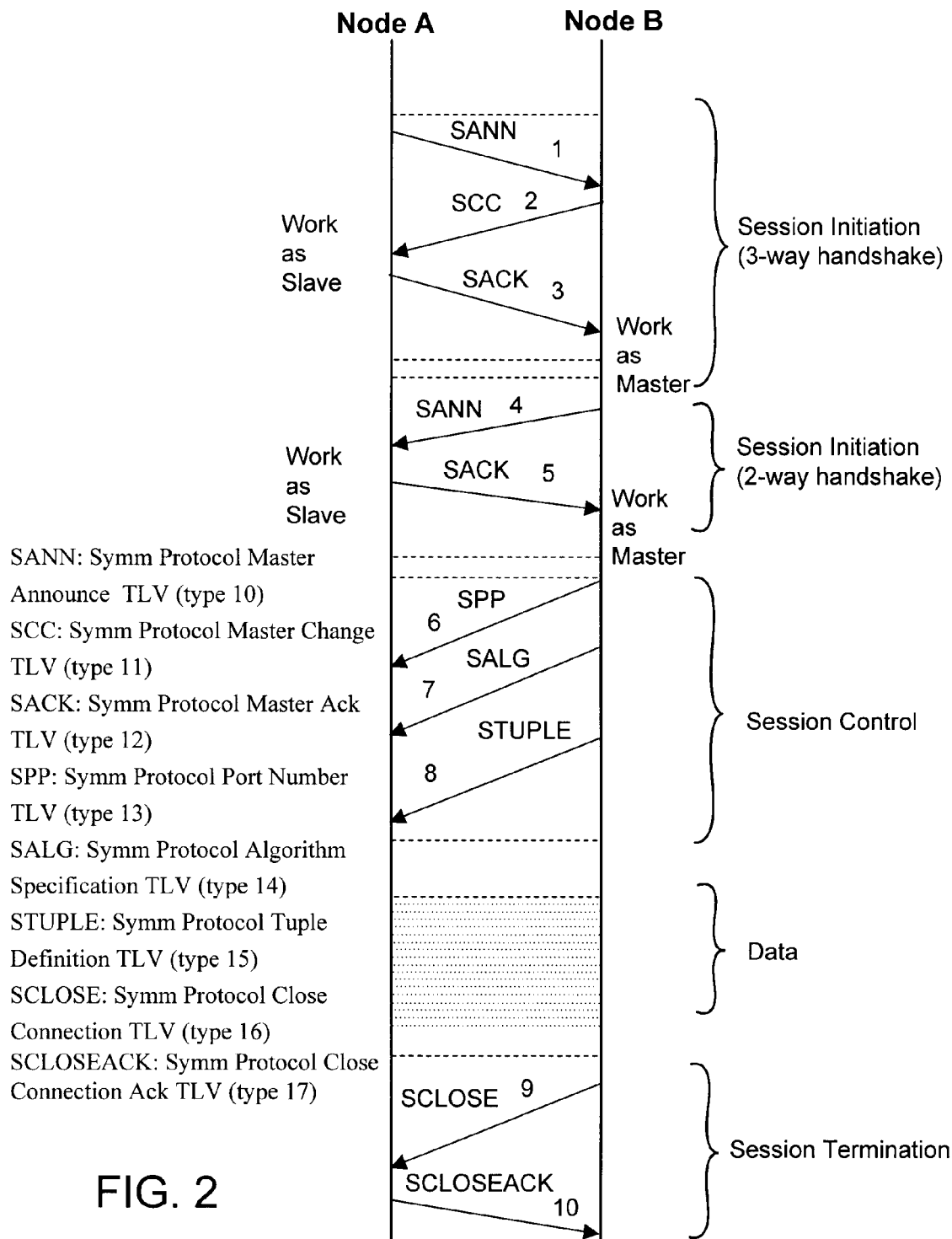
FIG. 2 illustrates the overall sequence for negotiating symmetric load sharing between two network nodes.
Figure 3:
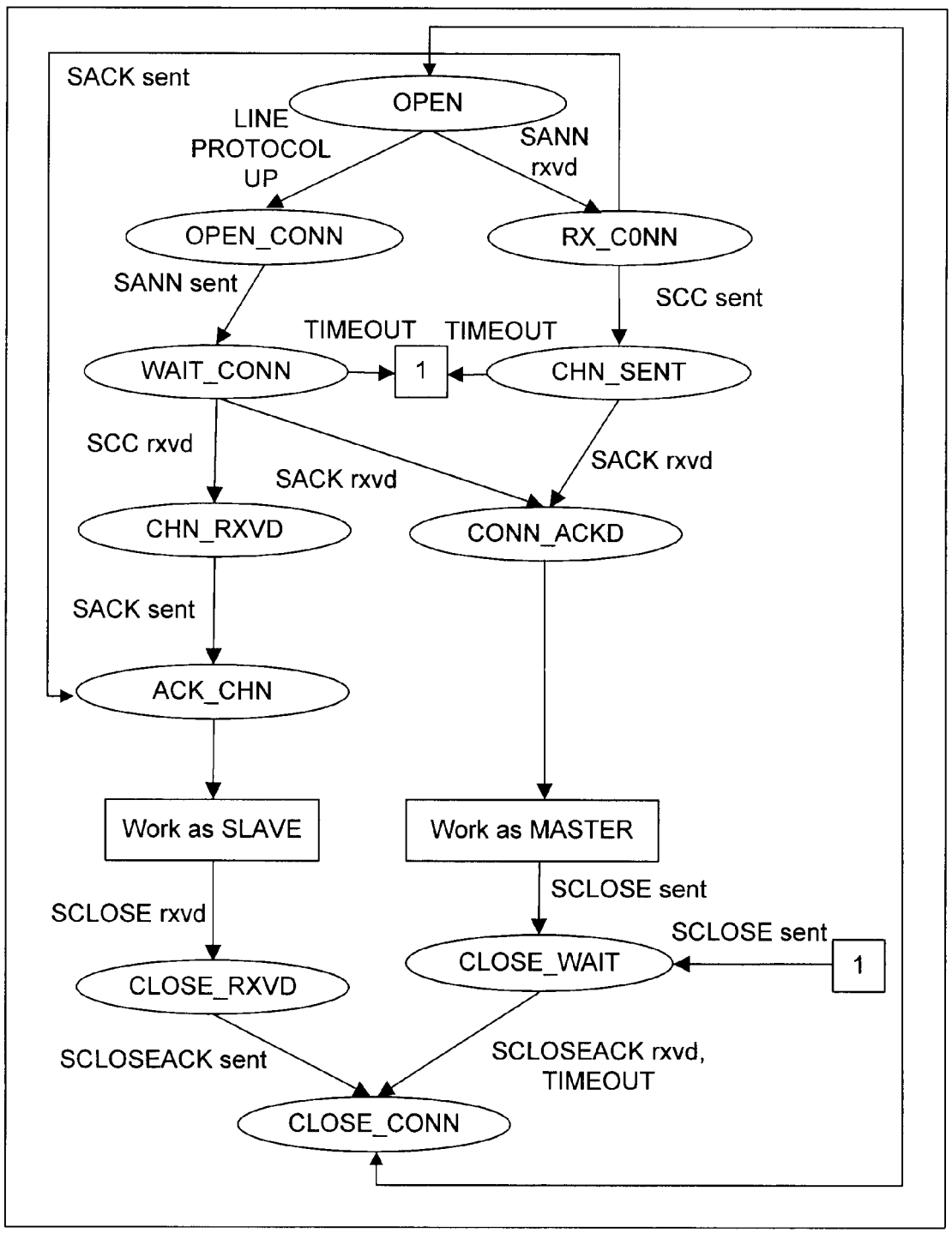
FIG. 3 illustrates an example internal state machine for a node participating in symmetric load sharing.

A flow diagram including a 3-way/2-way session initiation handshake per link bundled/unbundled, a session control exchange, a data exchange, and a session termination handshake in an EtherChannel is depicted in FIG. 2 and an example implementation of an autoconfiguration state machine is depicted in FIG. 3.

The operation of the PAgP extension TLVs set forth above will now be described with reference to FIGS. 2 and 3.

A session initiation 3-way handshake occurs when nodes A and B need to negotiate which is the master node. Node A sends a PAgP packet including a SANN TLV to node B(arrow 1). When this TLV is included in a PAgP packet, it tells node B that node A is the master switch being configured by the network system administrator. This TLV will only be sent by the switch which is configured to act as the master switch for supporting the multinode symmetric load-sharing functionality.

If node B receives this SANN TLV and, as in this example, happens to be configured incorrectly by the system administrator to also be a master node, then the node with the larger numeric value master node ID becomes the master node. The master node sends an SCC TLV(arrow 2) and the master node ID is placed after the SCC TLV.

Node A acknowledges node B's master status by adding a SACK TLV to a PAgP packet and sending the packet (arrow 3). Otherwise, node B sends a SANN TLV having fields [Type=10 (16 bits); Length=1 (16 bits); number of bytes in value; Value (no value)] in a PAgP packet.

If node B does not understand this SANN TLV, it will not send the SACK TLV. In this case, this multinode symmetric load-sharing scheme will not be used for the EtherChannel connecting the two nodes because a timer expires after transmitting the SANN TLV.

A session initiation 2-way handshake begins (arrow 4) with node B sending a SANN TLV in a PAgP packet. Node A responds (arrow 5) with a SACK TLV telling node B that it has received the PAgP packet. When node B receives the PAgP packet with the SACK TLV it will include the subsequent TLVs in PAgP packets in order to support this multinode symmetric load-sharing functionality.

The session control procedure will now be described. The session control procedure normalizes the hash algorithm as described above. The SPP TLV, in addition to the subsequent exchange described in FIG. 2, is utilized (arrow 6) for ensuring that the load-shared links are identically enumerated at the endpoint network nodes, the SALG TLV is utilized (arrow 7) to determine whether both nodes are utilizing the same hash algorithm, and the STUPLE TLV is utilized (arrow 8) to order the values of the hash function.

In the session control phase, node B, in this example acting as the master, sends PAgP packets including the SPP TLV, the SALG TLV, and the STUPLE TLV. Each of these TLVs will now be described in more detail.

The Multinode Symmetric Protocol Port Number (SPP) TLV is included in a PAgP packet by node B to tell node A the port/link number in the group. The port number is used for selecting the port after hashing a flow. This TLV's parameters are: Type=13; Length=4 (16 bits); Value1=virtual ID (32 bits) (potentially for supporting of hierarchical load-sharing bundles); value2=port number (32 bits). One SPP must be sent out of each member port.

The Symmetric Protocol Algorithm Specification (SALG) TLV, if included, designates the randomization algorithm to be used for the EtherChannel connecting the two adjacent nodes. This TLV's parameters are: 16-bit Type=14; 16-bit Length=the number of bytes that follows this field; 16-bit randomization method: 0=no randomization, 1=Fibonacci LFSR, 2=Galois LFSR, other values reserved (where the randomization method determines the meaning of subsequent bits). If a method of "Fibonacci or Galois LFSR" is chosen, then the subsequent bits are the 16-bit Sub-Length—the number of bytes that follow this field, 16-bit Polynomial Order—number of bits in the LFSR, 8-bit Number Of Taps—the number of bit positions of the shift register that are used by the polynomial, 16-bit Bit Position—bit position for each tap, and others to be defined.

The Symmetric Protocol Tuple Definition (STUPLE) TLV is included in the PAgP protocol packet when the node B is confirmed as the master switch and tells node A the order of the fields used in the hash algorithm as defined in the SALG TLV. A sample set of packet fields used as values are enumerated as follows: destination MAC address=1; source MAC address=2; EtherType=3, source IPv4 address=4; destination IPv4 address=5; source IPv6 address=6, destination IPv6 address=7, layer 4 protocol=8; layer 4 source port=9; layer 4 destination port=10. STUPLE TLV has the following parameters: Type=15 (8 bits); Length=number of bytes that follows this field (16 bits); Value1=flow ID; Sub-Length=number of bytes that follows this field; 8-bit Value2=argument number, e.g., 1=destination MAC address; 8-bit Value3=argument number, e.g., 2=source Mac address; Value4=argument number, e.g., 3=EtherType, etc.

Session termination is accomplished by node B, acting as the master, sending (arrow 9) a PAgP packet including the SCLOSE TLV and node A responding (arrow 10) with a PAgP packet including an SCLOSEACK TLV.

Figure 4:
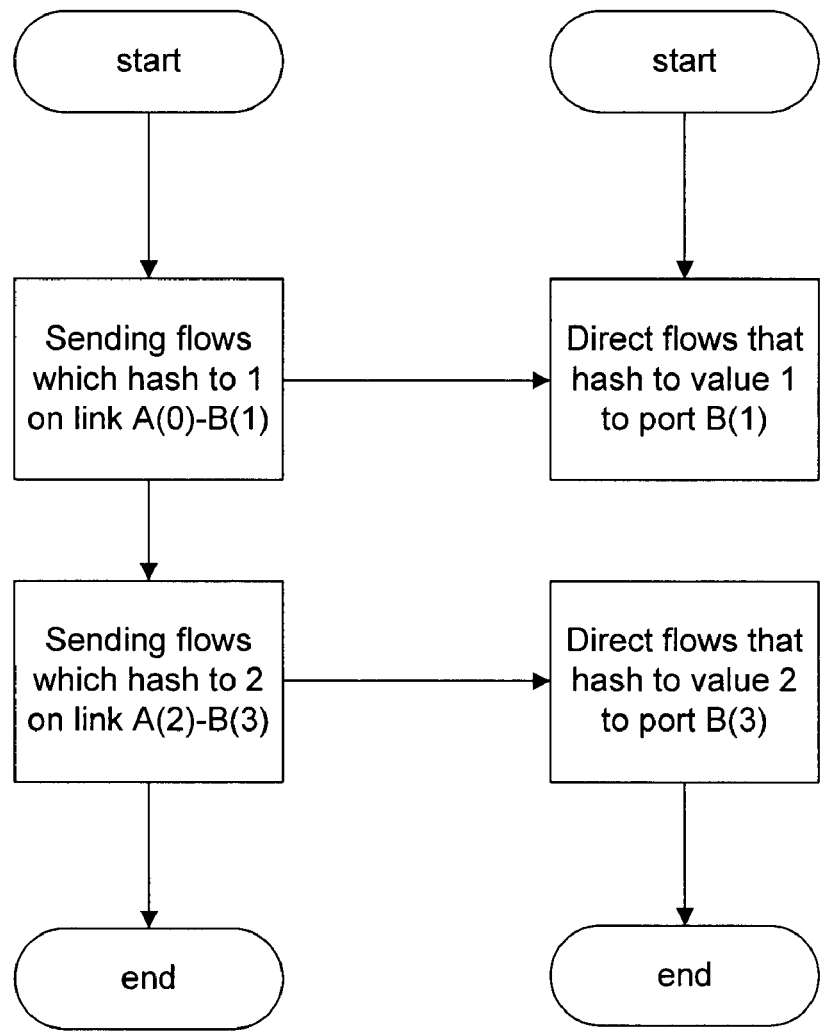
FIG. 4 illustrates an example technique for enumerating the links in the two network nodes.

A more detailed description of a protocol for ensuring that the load-shared links are identically enumerated in network nodes A and B will now be described with reference to the flow chart of FIG. 4.

Assuming that network node B functions as a master node, network node B goes through each of the load-shared links and sends a setup packet on each of the load-shared links in order to ensure the same ordering on the second network node. This is done via an echo check, e.g. network node B sends a packet saying:

a) "I'm sending this P->Q traffic which hashes to the value 1 on my first link, make sure the link that you would use to send P->Q (or Q->P) is this link so that it is also your first link on which the signaling packet is received. Echo back a Q->P packet on this link." Then network node B checks that network node A is sending the flow symmetrically.

b) "I'm sending this R->S traffic which hashes to the value 2 on my second link, make sure the link that you would use to send R->S (or S->R) is this link so that it is also your second link. Echo back an S->R packet on this link." Then network node B checks that network node A is sending the flow symmetrically."

c) repeat for all hash values.

The symmetric load sharing techniques described above solve several problems inherent in load-sharing techniques that allow non-symmetric flow exchange. Among these are: 1) with L2 load balancing on an EtherChannel distributed across multiple forwarding engines, this asymmetric traffic leads to complications in synchronization of MAC addresses across the forwarding engines, sometimes resulting in temporary floods of high bandwidth traffic and requiring expensive out of band solutions to try to limit these temporary floods; 2) With L2 or L3 load balancing, it becomes difficult to traffic engineer the flows and troubleshoot the traffic since a given bidirectional flow is not on one link; and 3) with L2 or L3 load balancing, when a link goes down, in one direction many flows may be affected because in that direction the flows are not directed to that downed link, while in the reverse direction the flows may be impacted because in the reverse direction the flows are directed to the downed link. This could result in the scenario of a larger bandwidth of flows being half impacted instead of a smaller bandwidth of flows being fully impacted, the latter being more desirable since half a bidirectional flow is not useful to forward.

In a symmetric load-sharing system these problems are obviated because each flow traverses only a single link in both directions.

Figure 5:
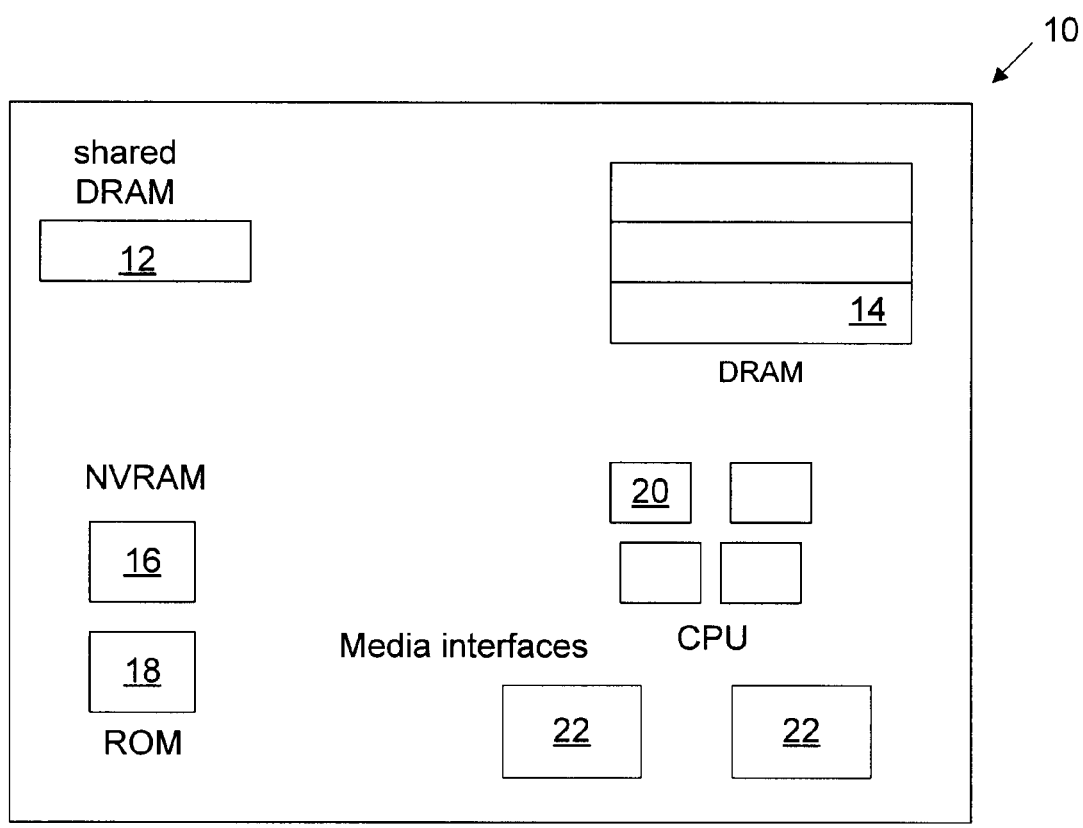
FIG. 5 illustrates an example of a network node.

FIG. 5 depicts an example of a network node, suitable for implementation of example embodiments, including a motherboard 10 having shared DRAM 12, DRAM 14, NVRAM 16, ROM 18, CPU 20 and media interfaces 22. (Other components on the motherboard not relevant to the present description are not depicted). The DRAM 14 is the working storage utilized by the CPU and the shared DRAM 12 is dedicated to handling the network node's packet buffer. The NVRAM (non-volatile RAM) is used to store the network node's configuration file and also includes flash memory for storing an image of the IOS® (Internetworking Operating System). The ROM 18 holds a boot-start program which holds a minimum configuration state needed to start the network node. Alternatively, other configurations of the motherboard may be used. For example, the motherboard may not have separate ROM or NVRAM and the configuration file and IOS® image may be stored and executed out of flash memory.

The example embodiments may be implemented either in the software included in the operating system, in dedicated hardware included on, for example, Application Specific Integrated Circuits (ASICs), in a combination of software and hardware, or by other means.

The invention has now been described with reference to the example embodiments. Alternatives and substitutions will now be apparent to persons of skill in the art. For example, the above example embodiments utilize EtherChannel. The described techniques of normalization can be utilized to achieve symmetric load sharing in any load-sharing system that implements the same load-sharing algorithm on both endpoint nodes coupled to the aggregated links. Further, control protocols other than the Packet Aggregation Protocol described above can be utilized as understood by persons of skill in the art. Accordingly, it is not intended to limit the invention except as provided by the appended claims.

What is claimed is:

1. A method comprising:

controlling a second network node, using a processor on a first network node, to utilize a load-sharing algorithm which is the same as the load-sharing algorithm used by the first network node to direct all packets of a bidirectional flow to a link in a plurality of links in a load-sharing channel, where packet fields are utilized as input values to the load-sharing algorithm, where the load-sharing algorithm always outputs a given numerical value corresponding to given input values, where the first and second network nodes are connected by a plurality of links aggregated into the load-sharing channel with each link coupled to a corresponding interface on a network node and where the network node selects an interface to which the bidirectional flow is directed in response to the numerical value output by the load-sharing algorithm;

controlling the second network node, using the processor on the first network node, to insert packet fields of packets of the bidirectional flow as input values to the load-sharing algorithm in the same order as the packet fields of packets of the bidirectional flow are inserted as input values to the load-sharing algorithm in the first network node so that the load-sharing algorithms on the first and second network nodes output the same numerical value for packets in the bidirectional flow; and controlling the second network node, using the processor on the first network node, to enumerate the interfaces connected to each of the plurality of links so that the first and second network nodes select interfaces connected to the same link in response to the same numerical value output by the load-sharing algorithm so that packets of a given bidirectional flow are directed to the same link by both the first and second network nodes.

2. The method of claim 1 where controlling the second network node to use the same load-sharing algorithm comprises:

sending a control packet from the first network node specifying the load-sharing algorithm to be utilized by the second node.

3. The method of claim 1 where controlling the second network node to insert packet fields comprises:

sending a control packet from the first network node to the second network node specifying a normalized order.

4. The method of claim 1 where controlling the second network node to insert packet fields comprises:
ordering the packet fields in the order of increasing size.

5. The method of claim 1 where controlling the second network node to enumerate interfaces comprises:
controlling the second node to enumerate the corresponding interface coupled to a first link in the plurality of links with the same number utilized by the first network node to enumerate the corresponding interface coupled to the link.

6. The method of claim 5 where controlling the second network node to enumerate interfaces comprises:
sending a message on the first link from the first network node specifying the number utilized by the first node to enumerate the first link.

7. An apparatus comprising:
means for controlling a second network node, to utilize a same load-sharing algorithm which is the same as the load-sharing algorithm used by the first network node to direct all packets of a bidirectional flow to a link in a plurality of links in a load-sharing channel, where packet fields are utilized as input values to the load-sharing algorithm, where the load-sharing algorithm always outputs a given numerical value corresponding to given input values, where the first and second network nodes are connected by a plurality of links aggregated into the load-sharing channel with each link coupled to a corresponding interface on a network node and where the network node selects an interface to which the bidirectional flow is directed in response to the numerical value output by the load-sharing algorithm;
means for controlling the second network node to insert packet fields of packets of the bidirectional flow as input values to the load-sharing algorithm in the same order as the packet fields of packets of the bidirectional flow are inserted as input values to the load-sharing algorithm in the first network node so that the load-sharing algorithms on the first and second network nodes output the same numerical value for packets in the bidirectional flow; and
means for controlling the second network node to enumerate the interfaces connected to each of the plurality of links so that the first and second network nodes select interfaces connected to the same link in response to the same numerical value output by the load-sharing algorithm so that packets of a given bidirectional flow are directed to the same link by both the first and second network nodes.

8. The apparatus of claim 7 where the means for controlling the second network node comprises:
means for sending a control packet from the first network node specifying the load-sharing algorithm to be utilized by the second node.

9. The apparatus of claim 7 where the means for controlling the second network node to insert packet fields comprises:
means for sending a control packet from the first network node to the second network node specifying the normalized order.

10. The apparatus of claim 7 where the means for controlling the second network node to insert packet fields comprises:
means for ordering the packet fields in the order of increasing size.

11. The apparatus of claim 7 where the means for controlling the second network node to enumerate interfaces comprises:
means for controlling the second network node to enumerate the corresponding interface coupled to a first link in the plurality of links with the same number utilized by the first network node to enumerate the corresponding interface coupled to the first link.

12. The apparatus of claim 11 where the means for controlling the second network node to enumerate interfaces comprises:
means for sending a message on the first link from the first node specifying the number utilized by the first node to enumerate the corresponding interface coupled to the first link.

13. An apparatus comprising:
a media interface configured so the apparatus functions as a first network node to be connected to a second network node by a plurality of links aggregated into a load-sharing channel:
a memory holding program code and data;
a processor configured to execute program code held in the memory to control the second node to utilize a load-sharing algorithm which is the same as the load-sharing algorithm used by the first network node to direct all packets of a bidirectional flow to a link in a plurality of links in a load-sharing channel, where packet fields are utilized as input values to the load-sharing algorithm, where the load-sharing algorithm always outputs a given numerical value corresponding to given input values, where the first and second network nodes are connected by a plurality of links aggregated into the load-sharing channel with each link coupled to a corresponding interface on a network node and where the network node selects an interface to which the bidirectional flow is directed in response to the numerical value output by the load-sharing algorithm, to control the second node to insert packet fields of packets of the bidirectional flow as input values to the load-sharing algorithm in the same order as the packet fields of packets of the bidirectional flow are inserted as input values to the load-sharing algorithm in the first network node so that the load-sharing algorithms on the first and second network nodes output the same numerical value for packets in the bidirectional flow, and to control the second node to enumerate the interfaces connected to each of the plurality of links so that the first and second network nodes select interfaces connected to the same link in response to the same numerical value output by the load-sharing interface so that packets of a given bidirectional flow are directed to the same link by both the first and second network nodes.

14. The apparatus of claim 13 where the processor is further configured to execute program code to:
send a control packet from the first network node specifying the load-sharing algorithm to be utilized by the second network node.

15. The apparatus of claim 13 where the processor is further configured to execute program code to:
send a control packet from the first network node to the second network node specifying a normalized order of the packet fields.

16. The apparatus of claim 15 where the processor is further configured to execute program code to:
order the packet fields in the order of increasing size.

17. The method of claim 13 where the processor is further configured to execute program code to:

control the second network node to enumerate the interface coupled to a first link in the plurality of links with the same number utilized by the first network node to enumerate the interface coupled to the first link.

18. The apparatus of claim 17 where the processor is further configured to execute program code to:

send a message on the first link from the first node specifying the number utilized by the first node to enumerate the interface coupled to the first link.

* * * * *